United States Patent
Kim

[19]

[11] Patent Number: 6,050,624
[45] Date of Patent: Apr. 18, 2000

[54] BUMPER MOUNTING STRUCTURE

[75] Inventor: Heui Su Kim, Anyang, Rep. of Korea

[73] Assignee: Hyundai Motor Company, Seoul, Rep. of Korea

[21] Appl. No.: 08/985,797

[22] Filed: Dec. 5, 1997

[30] Foreign Application Priority Data

Dec. 5, 1996 [KR] Rep. of Korea ............... 96-62161

[51] Int. Cl.[7] .................................................. B60R 19/26
[52] U.S. Cl. ..................... 293/132; 293/135; 293/136; 293/137
[58] Field of Search ................................ 293/132, 135, 293/136, 137; 248/900, 548; 267/139, 135, 205, 209

[56] References Cited

U.S. PATENT DOCUMENTS

| | | | |
|---|---|---|---|
| 2,997,325 | 8/1961 | Peterson | 293/133 |
| 3,301,335 | 1/1967 | Snelling | 293/136 X |
| 3,313,567 | 4/1967 | Sturman | 293/137 |
| 3,788,626 | 1/1974 | Isaacson | 296/135 X |
| 3,960,397 | 6/1976 | Janci | 267/139 X |
| 5,339,933 | 8/1994 | Bauer et al. | 267/139 X |
| 5,806,908 | 9/1998 | Kim | 296/36 |
| 5,941,582 | 8/1999 | Tan | 293/132 |

*Primary Examiner*—D. Glenn Dayoan
*Assistant Examiner*—Lori L. Coletta
*Attorney, Agent, or Firm*—Christie, Parker & Hale, LLP

[57] ABSTRACT

If an impact occurs with an impact energy which exceeds an elastic limit of a bumper while a shock-absorbing member is in a projected position, a bumper stay is forced to move rearward along a first actuating chamber to cause the shock-absorbing member to pivot to a received position. The impact energy is primarily absorbed by an elastic force of a first spring which biases the shock-absorbing member toward the projected position. When the impact energy is not thoroughly absorbed by the first spring, the shock-absorbing member fully pivots into its received position by the bumper stay which is continuously moved rearward. At this time, a second spring which biases the shock-absorbing member forward and is prevented from being stretched forward by the shock-absorbing member, is contacted with the bumper stay via a support plate. Accordingly, the second spring secondarily absorbs the impact energy while being more compressed by the bumper stay which continuously moves rearward after causing the shock-absorbing member to fully pivot to its received position.

16 Claims, 3 Drawing Sheets

BUMPER MOUNTING STRUCTURE

BACKGROUND OF THE INVENTION

1. Field of the Invention

The present invention relates to a bumper mounting structure, and more particularly to a bumper mounting structure which improves the impact energy absorbing property of a bumper to thereby minimize possibly injury to a driver and/or a passenger to and to prevent various parts in an engine room from being broken.

2. Description of the Related Art

A bumper is installed to a front end and a rear end of an automobile such that it can absorb an impact force exerted on it upon impact to thereby protect a body of the automobile. While, in the past, a bumper which projects a little from the body was used, more recently a larger bumper, which is called an energy absorbing bumper, has been used in America. Generally, a bumper has a construction in which an energy absorbing material is placed between a steel beam and a cover. Urethane, etc. can be used as the energy absorbing material.

More recently, instead of a bumper having a complicated construction as mentioned above, a back beam which is capable of maintaining a beam rigidity and at the same time absorbing an impact force, is widely used. The back beam for a bumper is manufactured by a blow molding process which is a kind of plastic molding and in which a doubly stacked sheet-shaped molding material or a tubular-shaped molding material is inserted into a mold and then air is blown into them to make a hollow-shaped product. By the blow molding process, a plurality of tack-off portions are formed in the back beam, and a plurality of lobes are defined in the back beam by the plurality of tack-off portions. A bumper cover is secured to the back beam by a retainer. A rib is provided in the back beam to maintain rigidity, and an air inlet is formed in the lower portion of the bumper cover to allow outside air to flow into engine room.

A bumper mounting structure of the prior art includes a bumper stay and a front side member. One end of the bumper stay is integrally fixed to the bumper, and the other end of the bumper stay is rigidly fastened to the front side member by a proper locking means as is known in the art.

However, in the bumper mounting structure of the prior art, constructed as mentioned above, since the bumper stay is rigidly fastened to the front side member, it becomes impossible to absorb impact energy exerted on the bumper upon impact at a connection between the bumper stay and the front side member. Accordingly, because there is a limit in capability of the bumper for absorbing the impact energy, when a low-speed impact occurs, various parts in an engine room are broken and possible injury to a driver and/or a passenger is increased.

SUMMARY OF THE INVENTION

Accordingly, the present invention has been made in an effort to solve one or more of the problems occurring in the related art, and an object of the present invention is to provide a bumper mounting structure which improves an impact energy absorbing property of a bumper to thereby minimize possible injury to a driver and/or a passenger and to prevent various parts in an engine room from being broken.

According to one aspect of the present invention, there is provided a bumper mounting structure for an automobile, comprising: a side member defining a first actuating chamber which is opened at one end; a bumper stay having one end secured to a bumper and the other end inserted into the first actuating chamber through an open end of the side member; and first shock-absorbing section for absorbing an impact energy exerted on the bumper upon impact.

According to another aspect of the present invention, the bumper mounting structure further comprises a second shock-absorbing section for absorbing the impact energy exerted on the bumper upon the impact.

According to another aspect of the present invention, the bumper mounting structure further comprises a release preventing section for preventing the bumper stay from being released from the side member.

According to another aspect of the present invention, the first shock-absorbing section comprises at least one pair of housing opposed to each other and each defining a second actuating chamber which is in communication with the first actuating chamber; a shock-absorbing member capable of pivoting between a projected position in which the shock-absorbing member projects into the first actuating chamber to prevent the bumper stay from being moved rearward toward the other end of the side member and a received position in which the shock-absorbing member is received into the second actuating chamber by the bumper stay moved rearward; and the first elastic member disposed in the second actuating chamber for biasing the shock-absorbing member toward the projected position.

According to another aspect of the present invention, the shock-absorbing member is pivotally fastened to the side member or the housing; one end of the first elastic member is fastened to the housing; and the other end of the first elastic member is fastened to the shock-absorbing member.

According to another aspect of the present invention, the second shock-absorbing section comprises second elastic member disposed in the first actuating chamber for biasing the shock-absorbing member toward the projected position.

According to another aspect of the present invention, one end of the second elastic member is fastened to the side member at a closed end of the first actuating chamber; a support plate is fastened to the other end of the second elastic member; and the support plate is contacted with the shock-absorbing member.

According to another aspect of the present invention, the shock-absorbing member has substantially a right-angled triangle shaped configuration; and an inclined surface of the shock-absorbing member is contacted with the bumper stay.

According to still another aspect of the present invention, the release preventing section comprises at least one guide pin having one end secured to the side member and the other end fitted into a slot formed in the bumper stay.

According to yet still another aspect of the present invention, each of the first actuating chamber, the second actuating chamber and the bumper stay has a rectangular or square shaped cross section.

By the features of the present invention, the bumper can be mounted to the front side member in a manner that it can move rearward of the automobile. When the impact occurs, the impact energy is primarily absorbed while the shock-absorbing member which is biased toward the projected position by the first elastic member pivots to a received position, and is secondarily absorbed while the second elastic member is moved rearward. As a result, according to the present invention, an impact energy absorbing property of a bumper is improved, whereby possible injury to a driver and/or a passenger is minimized and various parts in an engine room are prevented from being broken.

BRIEF DESCRIPTION OF THE DRAWINGS

The above objects, and other features and advantages of the present invention will become more apparent by describing in detail a preferred embodiment thereof with reference to the drawings, in which.

DETAILED DESCRIPTION OF A PREFERRED EMBODIMENT

Figure 1:
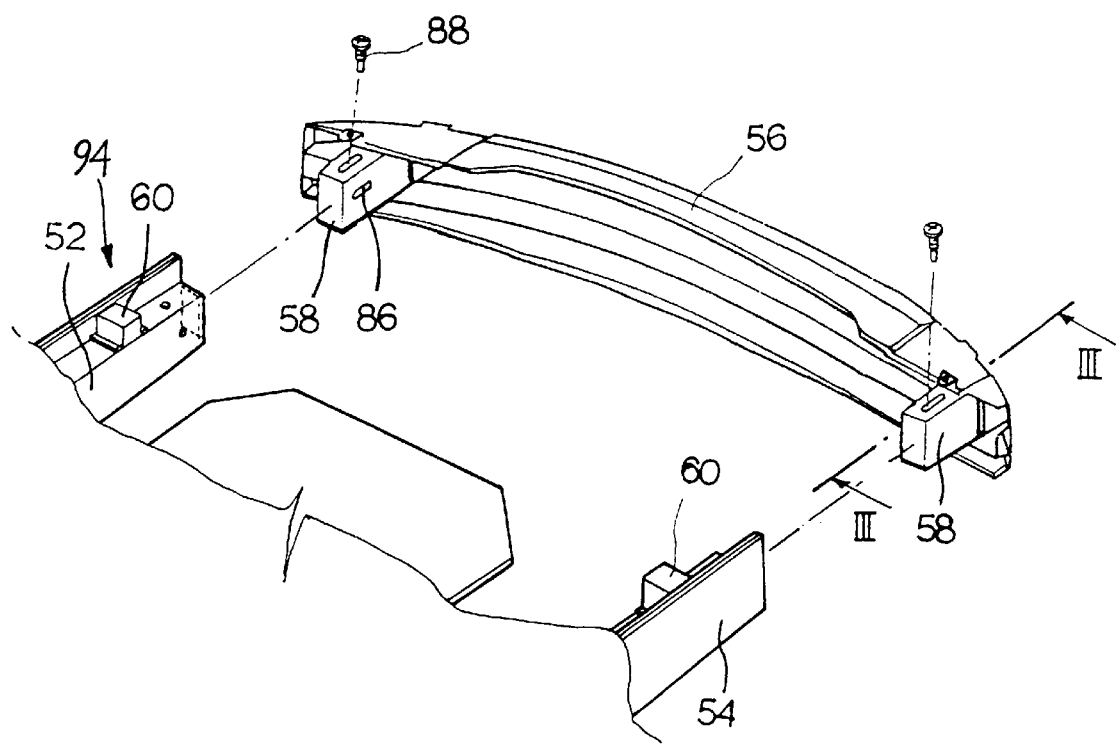
FIG. 1 is a perspective view illustrating a bumper which is to be mounted to a front side member according to the present invention.

Reference will now be made in greater detail to a preferred embodiment of the invention, an example of which is illustrated in the accompanying drawings. Wherever possible, the same reference numerals will be used throughout the drawings to refer to the same or like parts.

Figure 2:
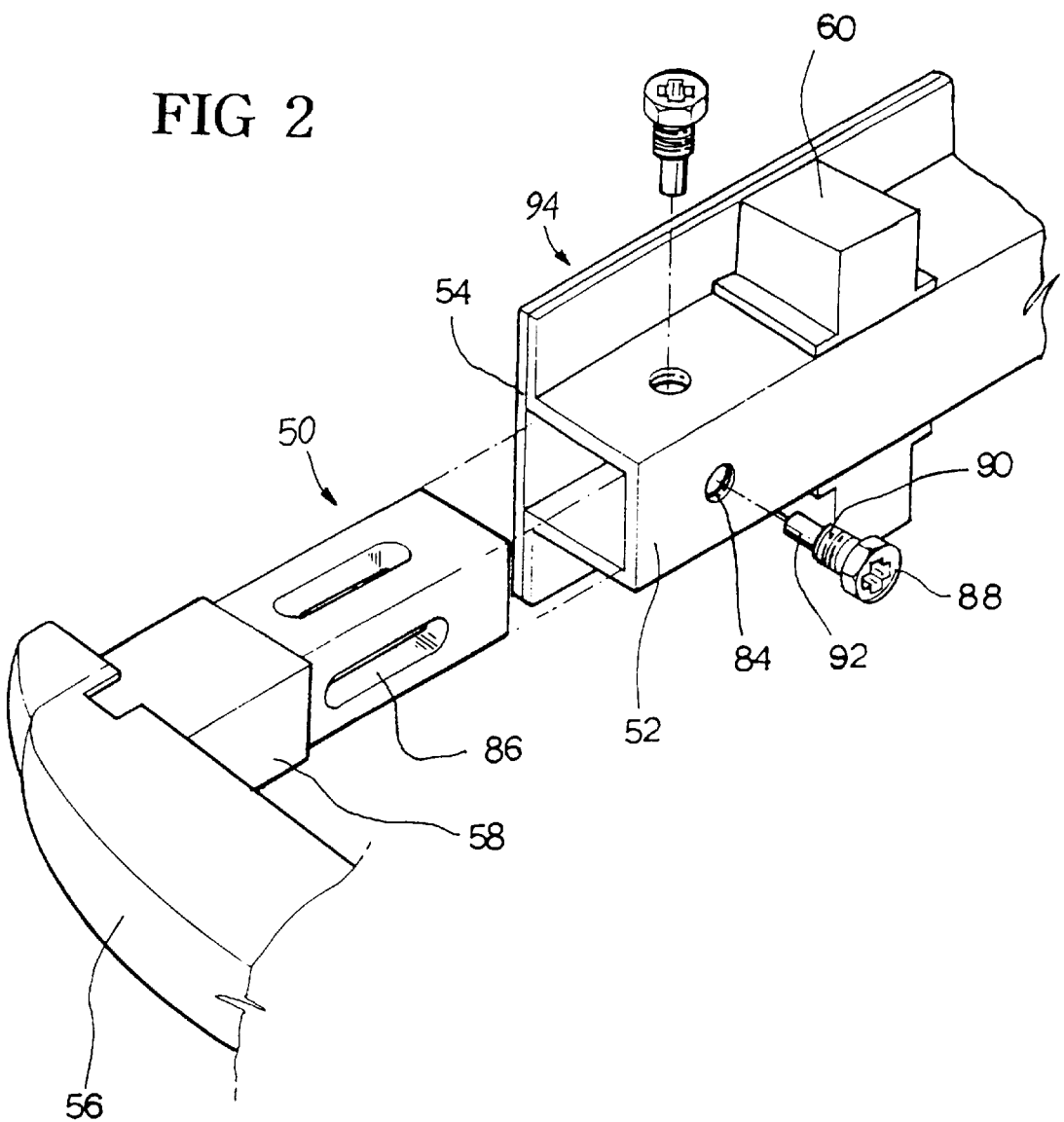
FIG. 2 is an exploded perspective view illustrating the outer appearance of a bumper mounting structure in accordance with an embodiment of the present invention.
Figure 3:
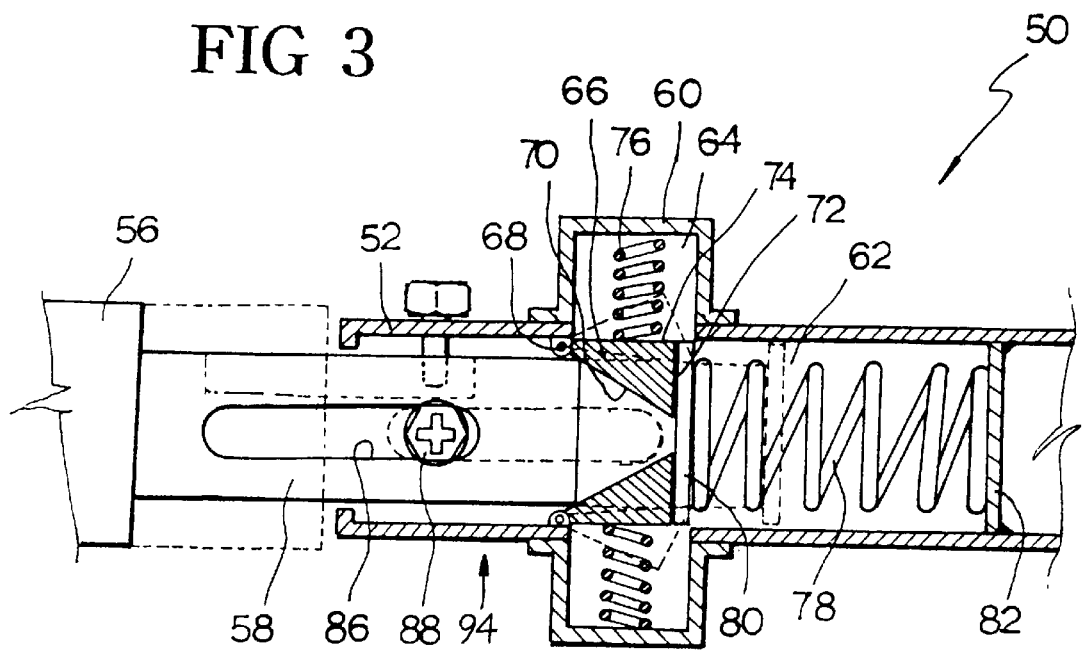
FIG. 3 is a cross-sectional view taken along a line III—III of FIG. 1, illustrating a state in which a shock-absorbing member used in the bumper mounting structure according to the present invention is in a projected position.
Figure 4:
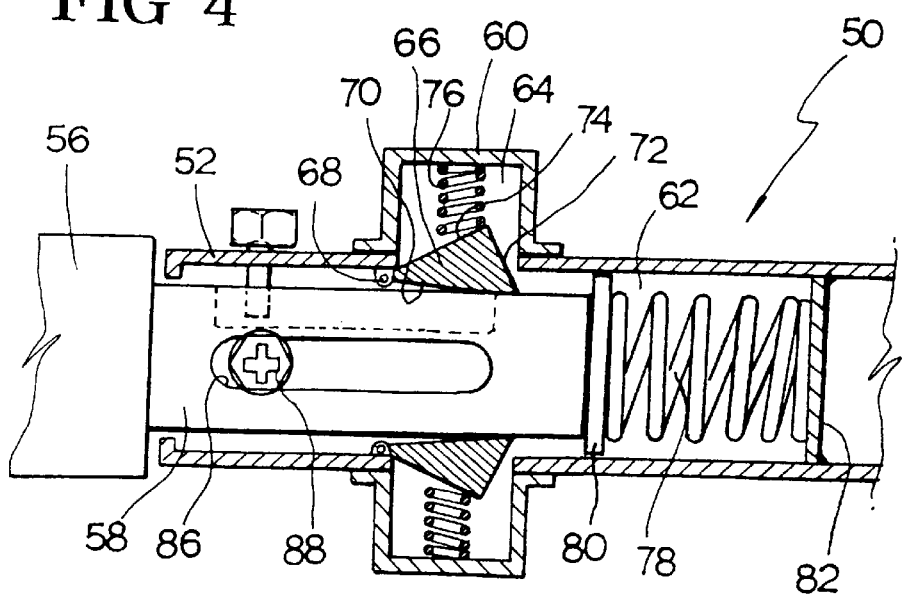
FIG. 4 is a cross-sectional view illustrating another state in which the shock-absorbing member is in a received position.

Referring to FIG. 1, there is illustrated a perspective view illustrating a bumper which is to be mounted to a front side member according to the present invention; FIG. 2 is an exploded perspective view illustrating an outer appearance of a bumper mounting structure in accordance with an embodiment of the present invention; FIG. 3 is a cross-sectional view taken along a section line III—III of FIG. 1, illustrating a state in which a shock-absorbing member used in the bumper mounting structure according to the present invention is in a projected position; and FIG. 4 is a cross-sectional view illustrating another state in which the shock-absorbing member is in a received position.

A bumper mounting structure 50 in accordance with an embodiment of the present invention includes a bumper stay 58 and a front side member. The bumper stay 58 has substantially a square-shaped cross section, and a front end of the bumper stay 58 is integrally fixed to a bumper 56.

Each upper surface and side surface of the bumper stay 58 is formed with a slot 86 which extends in a lengthwise direction to an automobile.

The front side member arranged rearward of the bumper 56 has a side member inner panel 52 and a side member outer panel 54. A middle portion of the side member inner panel 52 in its height is bent such that it has substantially a 'U' shaped cross section which is rotated 90° in a counter-clockwise direction. The side member inner panel 52 and the side member outer panel 54 are fastened to each other, by which substantially a square-shaped space, which extends in the lengthwise direction of the automobile, is formed in the front side member. At the point adjacent to a front end of the front side member, a stopper plate 82 is provided in the square-shaped space of the front side member, and the stopper plate 82 is rigidly secured to inner surfaces of the side member inner panel 52 and the side member outer panel 54 which cooperatively define the square-shaped space. By this, a first actuating chamber 62 is defined in the front end of the front side member. A front end of the first actuating chamber 62 is opened, and a rear end of the first actuating chamber 62 is closed by the stopper plate 82. A rear end of the bumper stay 58 is inserted into the first actuating chamber 62 through the open end of the first actuating chamber 62.

Substantially at an intermediate portion of the first actuating chamber 62, portions of a top wall and a bottom wall of the side member inner panel 52, which define the first actuating chamber 62, are cut out, and a pair of housings 60 having substantially a 'U' shaped cross section are fastened to the cut-out portions. The pair of housings 60 define a second actuating chamber 64 which is communicated with the first actuating chamber 62.

When assuming that there is a boundary line between the first actuating chamber 62 and the second actuating chamber 64, a pair of shock-absorbing members 66 are fastened to portions of the side member inner panel 52 which define a front end of the boundary line, respectively, such that they can pivot around a hinge shaft 68. Each shock-absorbing member 66 has substantially a right-angled triangle-shaped configuration which includes an inclined surface 70, a bottom surface 72 and a side surface 74.

One end of each of a pair of first springs 76 is secured to a bottom wall of the housing 60 which defines the second actuating chamber 64, and the other end of each of the pair of first springs 76 is secured to the side surface 74 of the shock-absorbing member 66 which has the right-angled triangle-shaped configuration. The first spring 76 functions to bias the shock-absorbing member 66 toward the first actuating chamber 62. A second spring 78 is disposed in the first actuating chamber 62 rearward of the shock-absorbing member 66. A rear end of the second spring 78 is secured to the stopper plate 82, and a support plate 80 is fastened to a front end of the second spring 78. The second spring 78 forward biases the shock-absorbing member 66 via the support plate 80, and the support plate 80 is maintained in a state that it is contacted with the bottom surface 72 of the shock-absorbing member 66.

The shock-absorbing member 66 can pivot between a received position in which it is received in the second actuating chamber 64 (see FIG. 3) and a projected position in which it is projected into the first actuating chamber 62 (see FIG. 4). As shown in FIG. 3, when the shock-absorbing member 66 is in the projected position, the inclined surface 70 of the shock-absorbing member 66 is maintained in a state that it is contacted with the bumper stay 58 inserted into the first actuating chamber 62.

Forward of the shock-absorbing member 66, a threaded hole 84 is formed in each upper-wall and side wall of the side member inner panel 52, and a guide pin 88 having a threaded portion 90 and a guide portion 92 is fitted into the threaded hole 84. The threaded portion 90 of the guide pin 88 is threaded into the threaded hole 84, and the guide portion 92 of the guide pin 88 is inserted into the slot 86 formed in the bumper stay 58. Because the guide pin 88 is fitted into the slot 86, the bumper stay 58 is prevented from being released from the front side member, and when an impact occurs, the bumper stay 58 can be moved by a distance corresponding to a length of the slot 86 while not causing deformation of the guide pin 88.

Hereinafter, operation of the bumper mounting structure 50 according to the present invention, constructed as mentioned above, will be explained in greater detail with reference to FIGS. 3 and 4.

Initially, if an impact occurs with an impact energy which exceeds an elastic limit of the bumper 56 while the shock-absorbing member 66 is in the projected position as shown in FIG. 3, the bumper stay 58 is forced to move rearward along the first actuating chamber 62 to cause the shock-absorbing member 66 to pivot to its received position. At this time, the impact energy is primarily absorbed by an elastic force of the first spring 76 which biases the shock-absorbing member 66 toward the projected position. When the impact energy is not thoroughly absorbed by the first spring 76, the shock-absorbing member 66 fully pivots into its received position by the bumper stay 58 which is continuously moved rearward. At this time, the second spring 78, which biases, the shock-absorbing member 66 forward and is prevented from being stretched forward by the shock-absorbing member 66, is contacted with the bumper stay 58 via the support plate 80. Accordingly, the second spring 78 secondarily absorbs the impact energy while being more compressed by the bumper stay 58 which continuously moves rearward after causing the shock-absorbing member 66 to fully pivot to its received position.

According to the construction as mentioned above, of the bumper mounting structure of the present invention, the bumper can be mounted to the front side member in a manner that it can move rearward of the automobile. When the impact occurs, the impact energy is primarily absorbed while the shock-absorbing member which is biased toward the projected position by the first spring pivots to the received position, and is secondarily absorbed while the second spring is moved rearward. As a result, according to the present invention, the impact energy absorbing property of a bumper is improved, whereby possible injury to a driver and/or a passenger is minimized and various parts in an engine room are prevented from being broken.

In the drawings and specification, there have been disclosed typical preferred embodiments of the invention and, although specific terms are employed, they are used in a generic and descriptive sense only and not for purposes of limitation, the scope of the invention being set forth in the following claims. For example, although it is explained in the above embodiment that the bumper stay 58 and the first actuating chamber 62 have a square shaped cross section and the shock-absorbing member 66 has a right-angled triangle-shaped configuration, it is to be readily understood that the spirit of the present invention is not limited to their shape in cross section or configuration. Further, although it is explained in the above embodiment that the pair of shock-absorbing members 66 disposed in an up-and-down relationship are provided, it is to be readily understood that another pair of shock-absorbing members disposed in a left-and-right relationship can be further arranged in addition to the pair of shock-absorbing members 66 disposed in the up-and-down relationship. Similarly, it is possible that a bottom surface and another side surface of the bumper stay 58 are formed with a slot and each of the panels 52 and 54 of the front side member has a corresponding construction.

What is claimed is:

1. A bumper mounting structure for mounting a bumper to an automobile, comprising:

a side member defining a first actuating chamber which is opened at one end;

a bumper stay having a first end secured to a bumper and a second end inserted into the first actuating chamber through the open end of the side member; and a first shock-absorbing means for absorbing an impact energy exerted on the bumper, the first shock-absorbing means comprising at least one pair of housings opposed to each other and each defining a second actuating chamber which is in communication with the first actuating chamber, a shock-absorbing member being pivotally attached to one of the side member and the housings, the shock-absorbing member being capable of pivoting between a projecting position in which the shock-absorbing member projects into the first actuating chamber to prevent the bumper stay from being moved rearwardly toward another end of the side member and a receiving position in which the shock absorbing member is received into the second actuating chamber when the second end of the bumper stay is moved further inwardly into the first actuating chamber, and a first elastic member disposed in the second actuating chambers for biasing the shock-absorbing member towards the projected position.

2. The bumper mounting structure of claim 1, wherein the first elastic member comprises a spring with two ends, one end being secured to the housing and the other end being secured to the shock absorbing member.

3. The bumper mounting structure of claim 1, wherein each of the first actuating chamber and the second actuating chambers and the bumper stays have a rectangular cross-sectional shape.

4. The bumper mounting structure of claim 1, wherein the shock-absorbing member has a substantially right-angled triangle-shape with an inclined surface that is in contact with a portion of the second end of the bumper stay.

5. The bumper mounting structure of claim 1, further comprises a second shock-absorbing means for absorbing an impact energy exerted on the bumper which is disposed in the first actuating chamber and which biases the shock-absorbing member toward a projected position.

6. A bumper mounting structure for mounting a bumper to an automobile, comprising:

a side member defining a first actuating chamber which is opened at one end;

a bumper stay having a first end secured to a bumper and a second end inserted into the first actuating chamber through the open end of the side member; and a first shock-absorbing means for absorbing an impact energy exerted on the bumper, the first shock-absorbing means comprising at least one pair of housings opposed to each other and each defining a second actuating chamber which is in communication with the first actuating chamber, a shock-absorbing member, the shock-absorbing member being capable of moving between a projecting position in which the shock-absorbing member projects into the first actuating chamber to prevent the bumper stay from being moved further inwardly into the first actuating chamber toward another end of the side member and a receiving position in which the shock absorbing member is received into the second actuating chamber when the bumper stay is moved inwardly, and a first elastic member disposed in the second actuating chamber for biasing the shock-absorbing member towards the projected position, wherein the shock-absorbing member has have a substantially right-angled triangle-shape with an inclined surface that is in contact with a portion of the bumper stay.

7. The bumper mounting structure of claim 6, further comprising a second shock-absorbing means for absorbing an impact energy exerted on the bumper which is disposed in the first actuating chamber and which biases the shock-absorbing member toward a projected position.

8. The bumper mounting structure of claim 7, wherein the second shock-absorbing means comprises a spring with a first end and a second end, wherein the first end is secured to the closed end of the first actuating chamber and the second end of the second shock-absorbing means is secured to a support plate, which support plate is in contact with the shock-absorbing member when the shock absorbing member is in the projected position.

9. The bumper mounting structure of claim 6, wherein each of the first actuating chamber and the second actuating chambers and the bumper stays have a rectangular cross-sectional shape.

10. A bumper mounting structure for mounting a bumper to an automobile, comprising:

a side member defining a first actuating chamber which is opened at one end;

a bumper stay having a first end secured to a bumper and second end inserted into the first actuating chamber through the open end of the side member;

a first shock-absorbing means for absorbing an impact energy exerted on the bumper; and a release preventing means for preventing the bumper stay from being released from the side member comprising at least one guide pin having one end secured to the side member and another end fitted into a slot formed in the bumper stay.

11. The bumper mounting structure of claim 10, wherein the first shock-absorbing means comprises at least one pair of housings opposed to each other and each defining a second actuating chamber which is in communication with the first actuating chamber, a shock-absorbing member being pivotally attached to one of the side member and the housings, the shock-absorbing member being capable of pivoting between a projecting position in which the shock-absorbing member projects into the first actuating chamber to prevent the bumper stay from being moved further inwardly into the first actuating chamber toward another end of the side member and a receiving position in which the shock absorbing member is received into the second actuating chamber when the bumper stay is moved inwardly, and first elastic member disposed in the second actuating chambers for biasing the shock-absorbing member towards the projected position.

12. The bumper mounting structure of claim 11, wherein each of the first actuating chamber and the second actuating chambers and the bumper stays have a rectangular cross-sectional shape.

13. The bumper mounting structure of claim 11, wherein the first elastic member comprises a spring with two ends, one end being secured to the housing and the other end being secured to the shock absorbing member.

14. The bumper mounting structure of claim 11, wherein the shock-absorbing member has a substantially right-angled triangle-shape with an inclined surface that is in contact with a portion of the second end of the bumper stay.

15. The bumper mounting structure of claim 10, further comprising a second shock-absorbing means for absorbing an impact energy exerted on the bumper which is disposed in the first actuating chamber and which biases the shock-absorbing member toward a projected position.

16. The bumper mounting structure of claim 15, wherein the second shock-absorbing means comprises a spring with a first end and a second end, wherein the first end is secured to the closed end of the first actuating chamber and the second end of the second shock-absorbing means is secured to a support plate, which support plate is in contact with the shock-absorbing member when shock absorbing member is in the projected position.

* * * * *